Patented Jan. 9, 1945

2,367,132

UNITED STATES PATENT OFFICE 2,367,132

METHOD OF PREPARING PECTIN

Herbert T. Leo, Clarence C. Taylor, and John W. Lindsey, Anaheim, Calif., assignors to Mutual Citrus Products Company, Anaheim, Calif., a corporation of California No Drawing. Application April 30, 1942, Serial No. 441,214

5 Claims. (Cl. 260—209.5)

This invention relates to a method of preparing high grade pectin in dry form.

In the conventional method of preparing pectin, fruits, vegetables or other cellulosic bodies containing pectin or pectous substances are treated with an acid aqueous medium to extract the pectin content in the form of a pectin solution containing from ½ to 1 per cent pectin. After such extraction the conventional method generally proceeds by way of a separation, as by filtration, of the extracted pectin solution and the spent pulp or pomace to separate a major portion of the cellulosic material from the solution. This separation is generally accompanied by a clarifying treatment of the extracted solution with diatomaceous earth or the like for the purpose of removing minute particles of pulp or like finely divided impurities in colloidal or coarse suspension in the extract. The filtered or clarified extract may then be concentrated, as by evaporation under a vacuum, until the pectin concentration is raised to about 3 per cent. Such a concentrated solution is extremely viscous, and for this reason further concentration is not practical on a commercial scale.

Concentration is generally continued until 1 gallon of concentrate will jell 50 pounds of sugar. In other words, 1 gallon pectin concentrate will contain the equivalent of ½ pound of 100 grade pectin or ¼ pound of 200 grade pectin.

Before the pectin is isolated from the concentrated extract, the pectin solution may be treated to lower its temperature of set, as described in our Patent No. 2,173,260, issued September 19, 1939.

The concentrated pectin extract contains, besides pectin, other dissolved solids in amounts that may equal the dissolved pectin. This dissolved solid matter may include mineral and other salts, fruit acids, sugars, coloring matter, flavoring principles, gummy carbohydrate materials and other soluble matter. The exact nature and amount of non-pectous material present in the pectin extract depend on the nature of the row material extracted and the specific details of the extraction method employed.

The further treatment of the concentrated pectin extract is directed to the separation of the pectin both from the aqueous extraction medium and from the non-pectous dissolved solids contained in the extract. Two types of treatment have heretofore been applied on a commercial scale to such separation. These two types of treatment will be discussed in some detail hereinbelow.

One conventional method of preparing pure dry pectin from the concentrated pectin extracts referred to hereinabove involves the addition of about 2 to 2½ gallons of 90 per cent alcohol (ethyl or isopropyl) to each gallon of concentrate. The pectin is then precipitated selectively, leaving a mother liquor containing about 60 to 65 per cent alcohol which retains in solution the non-pectous dissolved solid matter present in the concentrated extract. The alcoholic mother liquor is then distilled to recover the alcohol in concentrated form for reuse. If, for instance, to 500 gallons pectin concentrate there are added 1000 gallons 90 per cent ethyl alcohol, 125 pounds of 200 grade pectin (equal in volume to about 14 gallons) may be precipitated, leaving about 1486 gallons of 65 per cent alcohol to be distilled for reuse.

The other conventional method of preparing pure dry pectin from the concentrated pectin extracts referred to hereinabove involves an addition to the extract of a soluble aluminum salt and a base effecting a precipitation of aluminum hydroxide. The precipitate of aluminum hydroxide adsorbs and carries down with it the pectin and other dissolved solids in the form of wet curds. The precipitate as obtained cannot be used until the aluminum hydroxide and precipitated impurities have been removed, which may be done by adding hydrochloric acid and 90 per cent alcohol to the wet pectin to form a liquor containing not less than 60 per cent alcohol. This liquor will dissolve out the aluminum hydroxide and precipitated impurities but contains enough alcohol to keep the pectin from being dissolved. Or the pectin-aluminum hydroxide precipitate may be dried and then treated with 60 to 65 per cent alcohol acidified with hydrochloric acid. In either case the aluminum hydroxide precipitation method of isolating pure dry pectin leaves a liquor containing 60 to 65 per cent alcohol which must be distilled for reuse.

From the above discussion it will be seen that at some stage or another the conventional preparation of pure dry pectin from the concentrated pectin extracts conventionally prepared in the first stage of the manufacture of pure dry pectin necessarily involves the production of a 60 to 65 per cent alcoholic liquor which must be distilled for reuse. This fact is due to the necessity for at some time or other removing impurities that are soluble in water and dilute alcohol while at the same time maintaining the alcohol content of the treating medium high enough to insure non-solution of the pectin being treated. Further, the 60 to 65 per cent alcoholic liquor produced will contain water soluble impurities in amounts comparable to the amounts of pectin prepared.

Attempts have heretofore been made to prepare dry pectin from the concentrated pectin extracts referred to hereinabove by subjecting the extract to spray drying, drying on heated rollers or like drying steps. But in such direct drying steps the impurities present in the pectin extracts are carried over into the dried pectin, rendering the dried pectin hygroscopic and practically useless for commercial purposes. Pectin prepared from lemons by a process including spray dividing will usually test from 80 to 100 grade, which indicates about a 50 per cent content of impurities. Pectin similarly prepared from apples, oranges or other fruit material will show contents of undesirable impurities on the same order.

We have now found that impure spray dried pectin can be purified by treatment with 60 per cent alcohol preferably followed by washing with 90 per cent alcohol. More specifically, we have found that the 60 to 65 per cent alcoholic liquors obtained in the two above mentioned conventional processes of preparing pure dry pectin are well adapted for the purpose of purifying spray dried pectin by washing, in spite of the fact that these alcoholic liquors (particularly that obtained in the alcohol precipitation process) contain large amounts of the water soluble impurities which are to be washed out of the spray dried pectin. Spray dried pectin washed as disclosed will test about 100 to 200 grade. Thus, by combining the alcohol precipitation or the aluminum hydroxide precipitation methods of preparing pure dry pectin with a spray drying-washing method, large economies in the use of alcohol can be effected, as will be described in greater detail hereinbelow.

We have further found that pure dry pectin prepared as disclosed hereinabove by spray drying and washing first with 60 to 65 per cent alcohol and then with 90 per cent alcohol yields a pectin having a pH of set (defined in our Patent No. 2,173,260) higher than 3.20 at 218° F., which is too high for commercial jam and jelly making. We therefore prefer to reduce the pH of set prior to spray drying to below 3.00 by methods such as those described in our Patent No. 2,173,260 and including treatment in an acid medium. However, the spray drying of the resulting quite acid concentrate is not practically possible, for the acid will destroy the pectin under spraying conditions and will corrode the spraying equipment severely. Neutralization with sodium bicarbonate prior to spraying is not practical because of the tremendous volumes of gas generated. However, we have found that neutralization can be carried out with a sulfite, a bisulfite, an acetate, a benzoate, or alkali salts of other acids volatile with steam or combinations thereof without either corroding the spraying equipment or destroying the desired characteristics of the pectin being spray dried.

It is therefore an important object of the present invention to provide a method of preparing pure dry pectin involving a minimum of redistillation of alcohol used in said preparation.

Another important object of this invention is to provide a method of preparing pure dry pectin from concentrated aqueous pectin extracts involving the incidental production of a 60 to 65 per cent alcoholic liquid containing impurities derived from the extract and further involving spray drying pectin solutions and purifying the spray dried pectin by means of said alcoholic liquors.

A further important object of the invention is to provide a method of preparing pure dry pectin from concentrated aqueous pectin extracts including, in combination, an alcohol precipitation of part of the extract and a spray drying of another part of the extract, the alcoholic mother liquod obtained in the alcohol precipitation being utilized for washing the spray dried pectin.

Still another object of the invention is to provide a method of preparing a pure dry pectin from a pectin extract including treating said extract at a controlled pH acid value to reduce the pH of set of the pectin, reducing the acidity of the treated extract by means of a sulfite, bisulfite, acetate or combination thereof, spray drying the extract, and washing the spray dried product with a 60 to 65 per cent alcoholic liquor obtained incidentally in the preparation of pure dry pectin from a concentrated pectin extract by a precipitation method and containing impurities derived from the extract out of which the pectin has been precipitated.

Other and further objects and features of this invention will be apparent from the following more detailed disclosure and the appended claims.

In preparing pure dry pectin according to the present invention, a pectin extract obtained by conventional methods is treated at a pH, say, of 1.50 by the methods disclosed in our Patent No. 2,173,260 to reduce the pH of set of the pectin below 3.00. The extract may be concentrated by evaporation in vacuum before such treatment. After the treatment has been completed, the acidity of the extract is reduced, preferably to neutrality, by addition of sodium sulfite, and, optionally, sodium acetate. The extract is then spray dried.

During the spray drying, the sulfur dioxide and acetic acid set free on reduction of the acidity of the extract are driven off. The dried powder should contain a minimum of free acid. The powder should not have a pH below 2.30 or above 5.00. This value is determined by dissolving one ounce of powder in one pint of water.

The spray dried pectin thus obtained as a rule tests about 80 grade. To 500 pounds of the spray dried pectin may be added the spent 60 per cent alcohol obtained by precipitating with alcohol 500 gallons of pectin concentrate. The spray dried product is allowed to soak for some time and the mixture is then pumped through a filter press. The cake obtained is practically free from all non-pectous matter soluble in water or in alcohol. In particular, the products of the partial or complete neutralization with the sulfite or acetate have been washed out, being water soluble.

To the wet filter cake may then be added 500 gallons of 90 per cent alcohol, and the resulting mixture is then run through a filter press. This pressing removes traces of non-pectous matter soluble in water or alcohol and yields the cake in such a condition that the cake can be pressed exceedingly dry by hydraulic pressure. The press cake is then dried in vacuo.

Because the spray dried pectin is obtained in finely divided condition, it is easily washed and when dried need not be further pulverized.

The alcoholic liquor obtained by the second washing may be used to precipitate further amounts of pectin from a concentrated extract, having an alcohol content of about 85 per cent. The 500 gallons of 85 per cent alcohol obtained make up about one half of the alcohol required for treating 500 gallons of pectin concentrate.

The combined washing of the alcohol precipitate and the spray drying method for preparing pure dry pectin according to the present invention make possible repeated use of alcohol, with consequent great economy, as illustrated by the following data.

In making 125 pounds 200 grade pectin by the precipitation method, 500 gallons of pectin concentrate are treated with 1000 gallons 90 per cent alcohol, 1486 gallons of 60 per cent alcohol being obtained.

In making 200 pounds 200 grade pectin by washing 500 pounds spray dried pectin with 1486 gallons 60 per cent alcohol, 1425 gallons of spent alcohol are recovered for distillation for reuse.

In our improved process 1000 gallons of 90 per cent alcohol make 325 pounds of 200 grade pectin in place of 125 pounds obtainable by the precipitation method or 200 pounds by the spray drying-washing method.

In washing for the second time 1000 pounds of wet pectin obtained by spray drying and washing, 500 gallons of 90 per cent alcohol may be used which yield 551 gallons of 85 per cent alcohol which may be used to make up the 1000 gallons of alcohol required for precipitation of 500 gallons of pectin concentrate.

The aluminum hydroxide precipitation method can similarly be combined with the spray drying washing method, although alcohol containing aluminum chloride is not quite as desirable for washing spray dried pectin as the dilute alcohol obtained in precipitating pectin by concentrated alcohol.

While the alcohol concentration of the liquor obtained by alcohol precipitation of a pectin concentrate and the alcohol concentration in the liquor used for the initial washing of the spray dried liquor preferably falls within the range of 60 to 65 per cent, the operative range is broader, extending from about 50 to about 75 per cent. The concentration of the alcohol used for the second washing of the spray dried product need not be exactly 90 per cent, but may be as high as 95 per cent or as low as 85 per cent.

Many details of procedure may be varied within a wide range without departing from the principles of this invention and it is therefore not our purpose to limit the patent granted on this invention otherwise than necessitated by the scope of the appended claims.

We claim as our invention:

1. In a method of preparing dry pectin comprising extracting pectin from cellulosic material with an acid aqueous medium to form an extract containing pectin and non-pectous solids derived from said cellulosic material and dispersible in said medium, spray drying said extract and recovering the spray dried product containing said pectin and said non-pectous solids, the improvement including washing said spray dried product with 50 to 75 per cent aqueous alcohol.

2. In a method of preparing dry pectin comprising extracting pectin from cellulosic material with an acid aqueous medium to form an extract containing pectin and non-pectous solids derived from said cellulosic material and dispersible in said medium, concentrating said extract and spray drying the same to recover a solid product containing said pectin and said non-pectous solids, the improvement including washing the spray dried product with 50 to 75 per cent aqueous alcohol, then washing the washed pectin with 85% to 95% aqueous alcohol.

3. In a method of preparing dry pectin comprising extracting pectin from fruit material with an acid aqueous medium to form an extract containing pectin and non-pectous solids derived from said fruit material and dispersible in said medium, concentrating said extract and spray drying the same to recover a solid product containing said pectin and said non-pectous solids, the improvement including treating said extract prior to said spray drying to reduce the pH of set of the dissolved pectin below 3.00, adjusting the acidity of the extract so that the spray dried product will have a pH between 2.30 and 5.00, and washing the spray dried product with 50 to 75 per cent aqueous alcohol.

4. In a method of preparing dry pectin comprising extracting pectin from fruit material with an acid aqueous medium to form an extract containing pectin and non-pectous solids derived from said fruit material and dispersible in said medium, concentrating said extract and spray drying the same to recover a solid product containing said pectin and said non-pectous solids, the improvement including treating said extract prior to said spray drying to reduce the pH of set of the dissolved pectin below 3.00, adjusting the acidity of the extract by addition of a soluble sulfite so that the spray dried product will have a pH between 2.30 and 5.00, washing the spray dried product with 50 to 75 per cent aqueous alcohol, and washing the washed pectin with 85% to 95% aqueous alcohol.

5. A method of preparing a pure dry pectin including treating fruit material with an acid aqueous medium to form an extract containing pectin and non-pectous solids derived from said fruit material and dispersible in said medium, concentrating said extract, treating said extract at a low pH to reduce the pH of set of the dissolved pectin below 3.00 without destroying the jelling properties of said pectin, reducing the acidity of the treated pectin extract so that on spray drying the solid product obtained will have a pH of between 2.30 and 5.00, spray drying the treated extract after its acidity has been reduced to recover a product containing said pectin and said non-pectous solids, and washing the spray dried product fruit with 50 to 75 per cent aqueous alcohol and then with 85 to 95 per cent aqueous alcohol.

HERBERT T. LEO.
CLARENCE C. TAYLOR.
JOHN W. LINDSEY.